United States Patent
Gomadam et al.

(10) Patent No.: US 8,565,682 B1
(45) Date of Patent: Oct. 22, 2013

(54) FEEDBACK REDUCTION SCHEMES FOR COORDINATED TRANSMISSION

(75) Inventors: Krishna Srikanth Gomadam, Sunnyvale, CA (US); Adoram Erell, Herzliya (IL); Yan Zhang, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 428 days.

(21) Appl. No.: 12/917,252

(22) Filed: Nov. 1, 2010

Related U.S. Application Data

(60) Provisional application No. 61/257,791, filed on Nov. 3, 2009.

(51) Int. Cl.
*H04B 1/00* (2006.01)
*H04B 15/00* (2006.01)
*H04B 7/00* (2006.01)

(52) U.S. Cl.
USPC ............................................ 455/63.1; 455/69

(58) Field of Classification Search
USPC ......... 455/63.1, 67.11, 114.2, 278.1, 296, 24, 455/69, 126, 524
See application file for complete search history.

(56) References Cited

U.S. PATENT DOCUMENTS 8,359,042 B2 * 1/2013 Kim et al. .................. 455/452.2

* cited by examiner

*Primary Examiner* — Eugene Yun

(57) ABSTRACT

Some of the embodiments of the present disclosure provide a method for reducing interference feedback in a mobile device operating in a wireless system employing coordinated transmission. The method comprises the mobile device establishing a plurality of channels with a plurality of base stations. The plurality of base stations includes a serving base station and one or more interfering base stations. The method further comprises the mobile device reporting, to the serving base station, reduced feedback information including a vector approximation of a feedback matrix associated with an interfering channel established with an interfering base station. Other embodiments are also described and claimed.

20 Claims, 6 Drawing Sheets

US 8,565,682 B1

FEEDBACK REDUCTION SCHEMES FOR COORDINATED TRANSMISSION

CROSS REFERENCE TO RELATED APPLICATIONS

The present application claims priority to U.S. Provisional Application No. 61/257,791, filed Nov. 3, 2009, the entire specification of which is hereby incorporated by reference in its entirety for all purposes, except for those sections, if any, that are inconsistent with this specification.

TECHNICAL FIELD

The present disclosure relates to coordinated multi-point wireless transmission, and in particular to schemes to reduce the amount of mobile device feedback required to calculate coordinated schedules and precoders.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In conventional coordinated multi-point wireless systems, each mobile device measures interfering signals and reports back the channels of interfering base stations whose reference signal received power (RSRP) lies below a certain threshold. Each mobile device feeds back the full channel covariance matrix of all interfering cell channels that meet this threshold as well as the full channel covariance matrix of serving cell channels. The channel covariance matrices of each channel within the reporting set includes $(M^2-M)/2$ complex numbers plus M real numbers, where M is the number of transmitting antennae of the mobile device. Coordinated multi-point wireless systems use this feedback to control the precoding direction of signals transmitted by the base stations in order to reduce the strength of interfering signals received by the mobile devices.

SUMMARY

In various embodiments, the present disclosure provides a method for reducing interference feedback in a mobile device operating in a wireless system employing coordinated transmission. The method comprises the mobile device establishing a plurality of channels with a plurality of base stations. The plurality of base stations includes a serving base station and one or more interfering base stations. The method further comprises the mobile device reporting, to the serving base station, reduced feedback information including a vector approximation of a feedback matrix associated with an interfering channel established with an interfering base station.

The present disclosure also provides an apparatus comprising one or more antennae and a channel establishment module configured to establish a plurality of channels via the one or more antennae with a plurality of base stations. The plurality of base stations includes a serving base station and one or more interfering base stations. The apparatus further comprises a feedback reporting module configured to report to the serving base station, via the one or more antennae, reduced feedback information including a vector approximation of a feedback matrix associated with an interfering channel established with an interfering base station.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
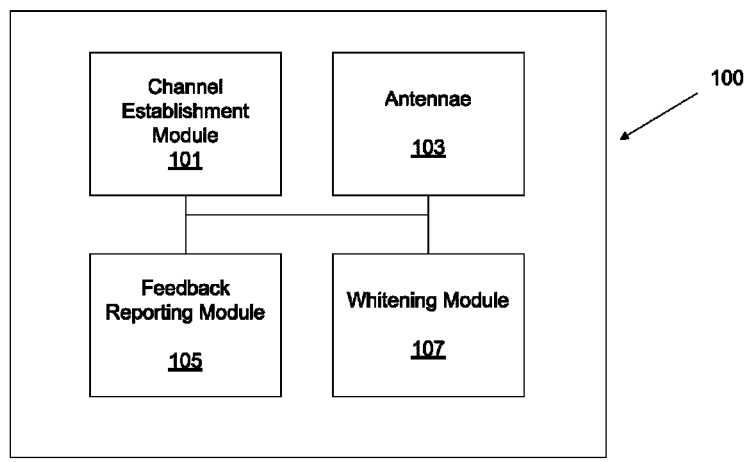
FIG. 1 schematically illustrates a mobile device configured to report reduced feedback to a serving base station, in accordance with embodiments of the present disclosure.

Although specific embodiments have been illustrated and described herein, a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The channel covariance matrices reported by mobile devices in conventional coordinated multi-point wireless systems can be very large. Embodiments of the present disclosure include mobile devices, base stations, centralized processors, wireless systems, and methods for reducing the amount of feedback in coordinated multi-point wireless systems. Mobile devices described herein report (i.e., feed back) vector approximations of the channel covariance matrices of channels established by the mobile device with the interfering base stations and, in embodiments, one or more vector approximations of the channel covariance matrices of channels established by the mobile device with their respective serving base stations. In addition, feedback information can be limited to a reduced set of antennae; for example, a mobile device may report a vector approximation for the antenna receiving the strongest interfering signal for each interfering channel in the reporting set, and a mobile device may report vector approximations for the two antennae receiving the strongest two signals from the serving base station.

Furthermore, the number of interfering channels in a reporting set can be reduced to less than all interfering channels; for example, mobile devices are configured to report feedback information for the two interfering channels with the strongest two signals. Taken together, these measures result in mobile devices configured to report two vector approximations of the covariance matrix associated with the channel established to the serving base station, and one vector approximation for the two covariance matrices associated with the two strongest interfering channels, although mobile devices may perform only some of these measures and remain within the scope of the present disclosure. Vector approximations are Eigen vector approximations. In this way, the total amount of feedback information is reduced relative to conventional coordinated transmission wireless systems.

Base stations are configured to distributedly calculate transmission schedules and precoders for each of the mobile devices based on the reduced feedback information described above. Wireless systems according to embodiments include a centralized processor configured to calculate transmission schedules and precoders for each of the mobile devices based on the reduced feedback information, and to provide the calculated transmission schedules and precoders to the base stations.

FIG. 1 schematically illustrates a mobile device configured to report reduced feedback to a serving base station, in accordance with embodiments of the present disclosure. Mobile device 100 includes channel establishment module 101 configured to establish a plurality of channels via one or more antennae 103 with a plurality of base stations including a serving base station and one or more interfering base stations. Feedback reporting module 105 is configured to report to the serving base station, via one or more antennae 103, reduced feedback information including a vector approximation of a feedback matrix associated with an interfering channel established with an interfering base station.

The vector approximation is an Eigen vector approximation of the feedback matrix. The Eigen decomposition of the feedback matrix is represented by the equation:

$$R = \sum_{i=1}^{N_T} \lambda_i v_i \cdot v_i^+$$

Where $N_T$ is the number of antennae, and where $\lambda$ and $v$ are the principal eigen-value and eigen-vector of R, respectively. Matrix R is $N_T \times N_T$ large. R can be approximated by the equation:

$$R = \sum_{i=1}^{x} \lambda_i v_i \cdot v_i^+$$

Where x is a number of antennae less than $N_T$. For example, an approximation of a covariance matrix for a serving channel established by mobile device 100 to a serving base station is calculated by using the two or three strongest signals received by antennae 103 of mobile device 100 (x=2 or 3). In another example, an approximation of a covariance matrix for an interfering channel established by mobile device 100 to an interfering base station is calculated by using the one or two strongest signals received by antennae 103 (x=1 or 2). Simulations for narrowband feedback and scheduling indicate that the performance degradation caused by feedback reduction strategies as described herein is relatively low versus using a full covariance matrix.

Furthermore, feedback reporting module 105 is configured to report reduced feedback information for less than all channels established with the plurality interfering base stations. For example, channel establishment module 101 establishes channels to four or more interfering base stations, but feedback reporting module 105 reports feedback information including vector approximations as described above for one, two, or three of the interfering channels, such as for example the one, two, or three interfering channels with the strongest interfering signals. In a further example, feedback reporting module 105 is configured to report feedback information for only the two interfering channels with the strongest signals.

As noted above, the vector approximation of a feedback matrix associated with an interfering channel established with an interfering base station includes an Eigen vector approximation of a strongest one of a plurality of interfering signals correspondingly received by a plurality of antennae of the mobile device. The vector approximation of a feedback matrix associated with an interfering channel established with an interfering base station includes only an Eigen vector approximation of a strongest one of a plurality of interfering signals correspondingly received by a plurality of antennae of the mobile device.

Feedback reporting module 105 is configured to report feedback information associated with the serving base station. Such feedback information includes an Eigen vector approximation of a strongest one of a plurality of serving signals correspondingly received by a plurality of antennae of the mobile device from the serving base station. Such feedback information includes two Eigen vector approximations of only a strongest two of a plurality of serving signals correspondingly received by a plurality of antennae of the mobile device from the serving base station.

Mobile device 100 includes whitening module 107 configured to whiten the reduced feedback information prior to reporting it to the serving base station. If the mobile device 100 is capable of cancelling some interference, whitening module 107 whitens the feedback information. Mobile device 100 may be a minimum mean square error (MMSE) receiver or it may be a maximal ratio conforming (MRE) receiver (or other receiver types).

In embodiments where feedback reporting module 105 is configured to perform a combination of various functions described above, the feedback is reduced from one $N_T \times N_T$ matrix for each interfering channel established by channel establishment module 101 (as in conventional designs), to two $N_T \times 1$ vectors corresponding to the two interfering channels having the strongest signals and two $N_T \times 1$ vectors corresponding to the strongest two signals of the serving channel established by antennae 103 with the serving base station. In this way, mobile device 100 is configured to report back less feedback information than is reported by conventional mobile devices in a coordinated transmission wireless system.

Feedback reporting module 105 may feed back the channel transmit covariance. This feedback may be whitened. When reporting whitened feedback, the channel matrices of all reported cells are whitened by the covariance of interference from cells outside the reporting set (plus thermal noise). Feedback reporting module calculates the transmit channel covariance, which is averaged across time and frequency. The whitened channel covariance is given by:

$$R = \sum_{f,t} H^*(f,t) K^{-1}(f,t) H(f,t)$$

Where H(f, t) is the channel realization at (f, t) and K(f, t) is the covariance estimate of the noise and interference outside the reporting set, averaged over the previous 10 TTIs. The sum over frequency is performed over the entire bandwidth while the time summation is over the feedback update interval. The channel whitening obviates the need for an explicit noise feedback. In alternative embodiments, the feedback may be non-whitened, which may be given by: $$R = \sum_{f,t} H^*(f,t) H(f,t)$$

When feedback module 105 reports non-whitened feedback, it will also feed back the average noise covariance received at mobile device 100. Such noise may be given by:

$$N_0 = \frac{\text{trace}(\overline{K})}{N_r}$$

Figure 2:
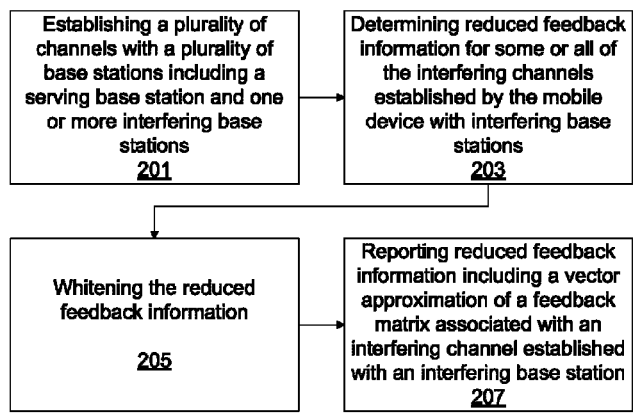
FIG. 2 illustrates a reduced feedback reporting technique to a serving base station, in accordance with embodiments of the present disclosure.

FIG. 2 illustrates a reduced feedback reporting technique to a serving base station, in accordance with embodiments of the present disclosure. A mobile device will establish a plurality of channels with a plurality of base stations including a serving base station and one or more interfering base stations, block 201. The mobile device determines reduced feedback information for some or all of the interfering channels established by the mobile device with interfering base stations, block 203. The mobile device also determines reduced feedback information for the channel established with the serving base station. The mobile device whitens the reduced feedback information, block 205. The mobile device reports to the serving base station reduced feedback information including a vector approximation of a feedback matrix associated with an interfering channel established with an interfering base station, block 207.

The reduced feedback information includes feedback information for less than all channels established with the plurality of interfering base stations, such as for example only two channels established with two of the plurality of interfering base stations. Where feedback information for only two channels is reported, the two channels can be for example the two channels having the strongest signals received by the mobile device.

The vector approximation may include an Eigen vector approximation of a strongest one of a plurality of interfering signals correspondingly received by antennae of the mobile device. The feedback information for any given channel may be limited to only one Eigen vector approximation of the strongest interfering signal of the plurality of interfering signals correspondingly received by the antennae of the mobile device.

The reduced feedback information may include feedback information associated with the serving base station that includes an Eigen vector approximation of a strongest one of a plurality of signals correspondingly received by antennae of the mobile device from the serving base station. Such feedback information associated with the serving base station is limited in embodiments to two Eigen vector approximations of only the strongest two of the plurality of serving signals correspondingly received by a plurality of antennae from the serving base station.

Next, a wireless system employing coordinated transmission with reduced feedback will be described.

Figure 3:
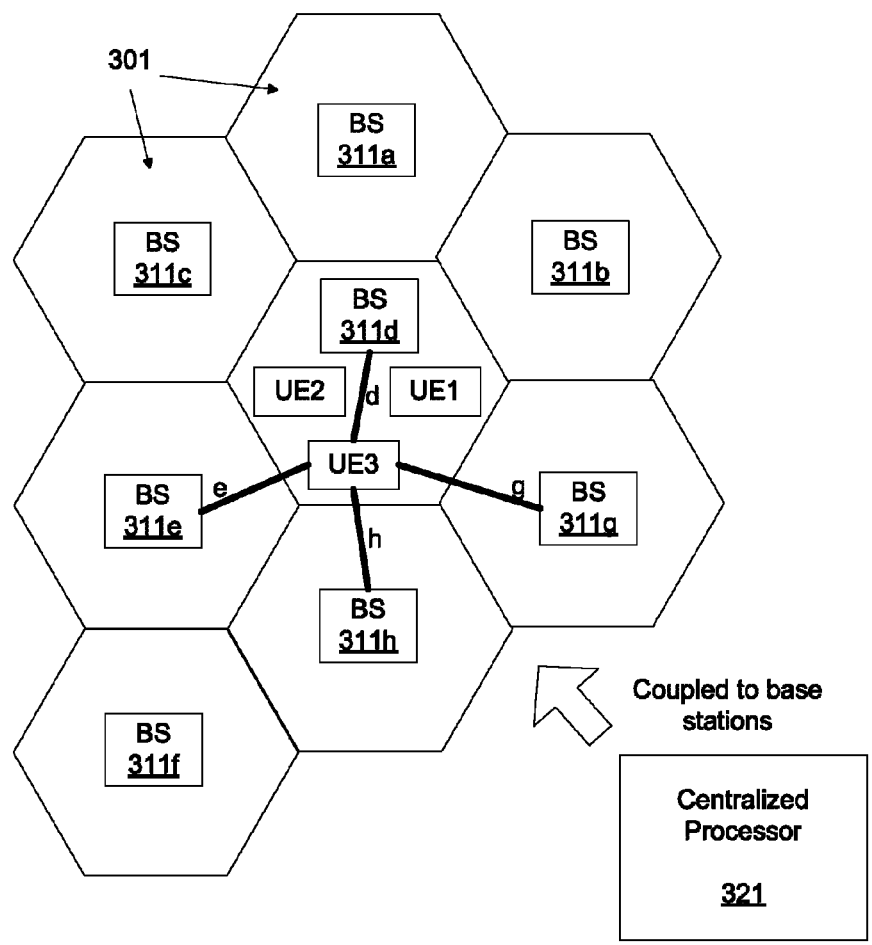
FIG. 3 schematically illustrates a wireless system employing coordinated transmission with reduced feedback, in accordance with embodiments of the present disclosure.

FIG. 3 schematically illustrates a wireless system employing coordinated transmission with reduced feedback, in accordance with embodiments of the present disclosure. Wireless system 300 includes a plurality of serving cells 301. Serving cells 301 need not be hexagonal as shown in FIG. 3; serving cells 301 are shown hexagonal in FIG. 3 purely for the sake of illustration. Also, the number of serving cells 301 may be larger or smaller than the number shown in FIG. 3. Each serving cell 301 is served by one of base stations 311*a-h*. Serving cell 301 served by base station 311*d* includes a plurality of mobile devices UE1, UE2, and UE3, as well as other mobile devices (not shown). It will be understood that each serving cell 301 serves a plurality of other mobile devices (not shown).

UE3 is shown in FIG. 3 with channel "e" established to base station 311*e*, channel "g" established to base station 311*g*, and channel "h" established to base station 311*h*. UE3 establishes a channel "d" to serving base station 311*d*. It will be understood that mobile devices UE1, UE2, and UE3 as well as other mobile devices within the same or different serving cell establish more or fewer than three channels to base stations 311; UE3 is shown in FIG. 3 with three established channels purely for the sake of illustration.

The base stations 311 are configured to receive reduced feedback information from a plurality of mobile devices served by the base stations. For example, base station 311*d* is configured to receive reduced feedback information from mobile devices UE1, UE2, and UE3 (as well as any other mobile devices served by base station 311*d*). Other base stations 311 are configured to receive reduced feedback information from other mobile devices (not shown). Such reduced feedback information includes vector approximations of feedback matrices associated with interfering channels established by various ones of the mobile devices with various ones of the plurality of base stations, as is described elsewhere within this Detailed Description.

Wireless system 300 includes centralized processor 321, operatively coupled to base stations 311. Such operative coupling may be wired or wireless. Centralized processor 321 is configured to perform an iterative process to arrive at a scheduling and precoding for each mobile device in each cell. The purpose of the iterative process is to utilize reduced feedback information in order to calculate scheduling and precoding for each mobile device. Utilizing the reduced feedback information allows a reduction in the interference caused by signals transmitted from base stations 311 and received by mobile devices outside of the cells served by those base stations. For example, precoding and scheduling for mobile devices within cells 301 served by one or more of base stations 311e, 311h, and 311g is established so as to reduce the strength of interfering signals received by UE3 from those base stations, as well as other mobile devices served by base station 311d or others of base stations 311.

The iterative process includes establishment of initial transmission schedules and precodings for the mobile devices based on priority metrics calculated based on a lack of coordinated transmission. Centralized processor 321 is configured to iteratively determine coordinated transmission schedules and precodings for the plurality of mobile devices served by the plurality of base stations, using the reduced feedback information. A first iteration is based on received reduced feedback information determined by the mobile devices after the initial transmission schedules and precodings are implemented by the plurality of base stations. Subsequent iterations are based on new received reduced feedback information determined by the mobile devices after preceding iteratively determined coordinated transmission schedules and precodings are implemented by the plurality of base stations. For example, a precoder for UE 1 is calculated as:

$$F_1 = eig\left[\left(\sum_{m \in A_1} \frac{R_{m1}}{I_m^{1-}} + I\right)^{-1} R_{11}\right]$$

Where $R_{kj}$ is the channel covariance estimate of cell j as measured and reported by UE k, and where $F_j$ is the precoder of cell j. $A_k$ is the set containing the tentative UEs that reported cell k in the reporting set, and where $I_m^{k-}$ is defined as $$I_m^{k-} = N_{0m} + \sum_{n \in B_m \setminus \{k, s(m)\}} \text{trace}(F_k^* R_{mm} F_k)$$

Where $B_m$ contains the set of cells in the reporting set of UE m, and s(m) is the serving cell of UE m. In embodiments using whitened feedback, $N_{0m}=1$. $N_{0m}$ is the noise variance (i.e., the noise spectral density) at of UE m. For embodiments utilizing multi-user multiple-input and multiple-output (MU-MIMO), the precoder design also considers interference from the serving base station/cell.

Once the precoders are computed based on the feedback determined by the mobile devices after the initial precoders are implemented by the base stations—or after a subsequently calculated precoder is implemented by the base stations—the achievable rates for the tentative UEs is recalculated (these are the subsequent iteration steps). For example, in single user (SU) mode, the signal-to-noise ratio (SNR) of UE1 is estimated by the centralized processor as follows:

$$SNR = \frac{F_1^* R_{11} F_1}{1 + \sum_{j \in S} F_j^* R_{j1} F_j}$$

For MU-MIMO embodiments, each cell schedules two UEs (for example UE1 and UE2) and the SNR estimates for the paired UEs in the cell is obtained by:

$$SNR_1 = \frac{F_{11}^* R_{11} F_{11}}{1 + F_{12}^* R_{11} F_{12} + \sum_{j \in S_1} \sum_{k=1}^{2} F_{jk}^* R_{1j} F_{jk}}$$

$$SNR_2 = \frac{F_{12}^* R_{21} F_{12}}{1 + F_{11}^* R_{21} F_{11} + \sum_{j \in S_2} \sum_{k=1}^{2} F_{jk}^* R_{2j} F_{jk}}$$

Where $F_{jm}$ is the precoder of UE m from cell j, and $S_m$ is the set of interfering cells reported by UE m. The per-UE achievable rates are estimated based on the SNR and normalized by their average throughput for proportional fairness. The pair of UEs that maximizes the sum of normalized rates is tentatively updated as the scheduled UEs. These iterations continue for a number of cycles, which may be a predetermined number.

The reduced feedback information includes vector approximations of feedback matrices for less than all interfering channels established by various ones of the mobile devices with interfering base stations 311. The reduced feedback information includes vector approximations of feedback matrices for only two interfering channels established by various ones of the mobile devices with interfering base stations 311.

Centralized processor 321 is configured to provide the coordinated transmission schedules and precoders to base stations 311. In other embodiments—such as those depicted in FIG. 4—base stations are configured to distributedly calculate coordinated transmission schedules and precoders.

Figure 4:
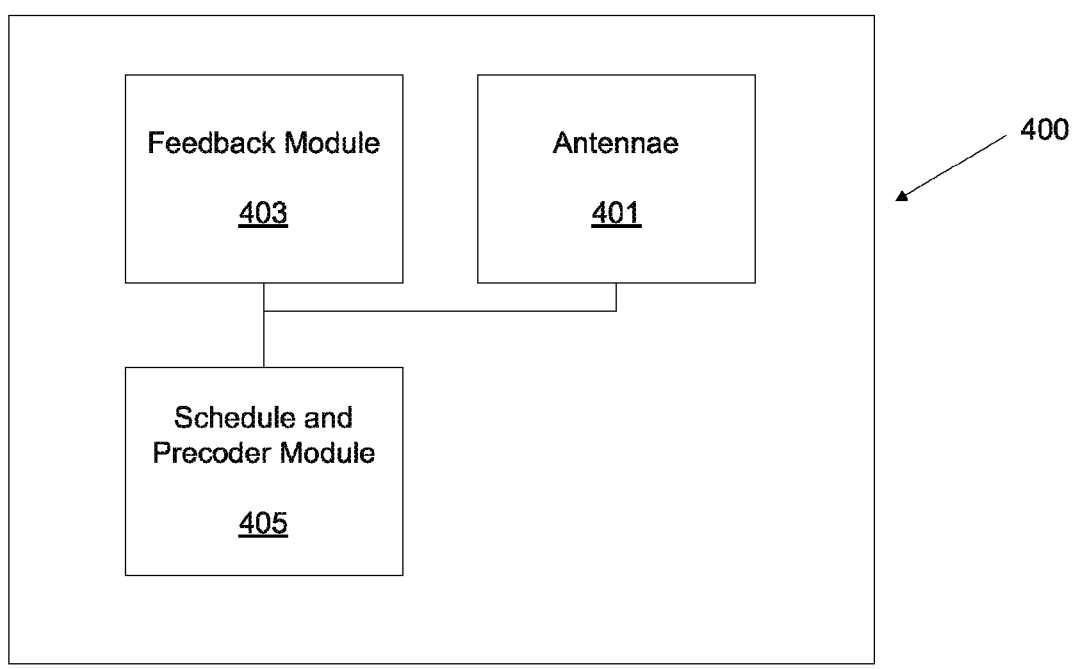
FIG. 4 schematically illustrates a base station employing coordinated transmission with reduced feedback, in accordance with embodiments of the present disclosure.

FIG. 4 schematically illustrates a base station employing coordinated transmission with reduced feedback, in accordance with embodiments of the present disclosure. Base station 400 includes a plurality of antennae 401 coupled to a feedback module 403 and a schedule and precoder module 405. Feedback module 403 is configured to receive reduced feedback information from a plurality of mobile devices served by base station 400, via the plurality of antennae 401. Feedback module 403 is also configured to receive, from one or more other base stations (not shown), reduced feedback information for a plurality of other mobile devices served by the other base stations. The reduced feedback information includes vector approximations of feedback matrices associated with interfering channels established by various ones of the mobile devices with base station 400.

Schedule and precoder module 403 is configured to establish initial transmission schedules and precodings for the mobile devices based on priority metrics calculated based on a lack of coordinated transmission. Schedule and precoder module 403 is configured to iteratively determine coordinated transmission schedules and precodings for the plurality of mobile devices. A first iteration is based on received reduced feedback information determined by the mobile devices after the initial transmission schedules and precodings are implemented by base station 400. Subsequent iterations are based on new received reduced feedback information determined by the mobile devices after preceding iteratively determined coordinated transmission schedules and precodings are implemented by base station 400. Such scheduling and precoders are calculated as described above with respect to FIG. 4, with some differences. In a distributed coordination, the scheduling algorithm can be done online, meaning that the iterations are actual transmissions. Whereas in the centralized case, the iterations are part of a scheduling algorithm that outputs the scheduling decisions.

The reduced feedback information includes vector approximations of feedback matrices for less than all interfering channels established by various ones of the other mobile devices with the base station. The reduced feedback information may include vector approximations of feedback matrices for only two interfering channels established by various ones of the other mobile devices with the base station. The reduced feedback information includes vector approximations of feedback matrices for channels established by various ones of the mobile devices with the base station.

Figure 5:
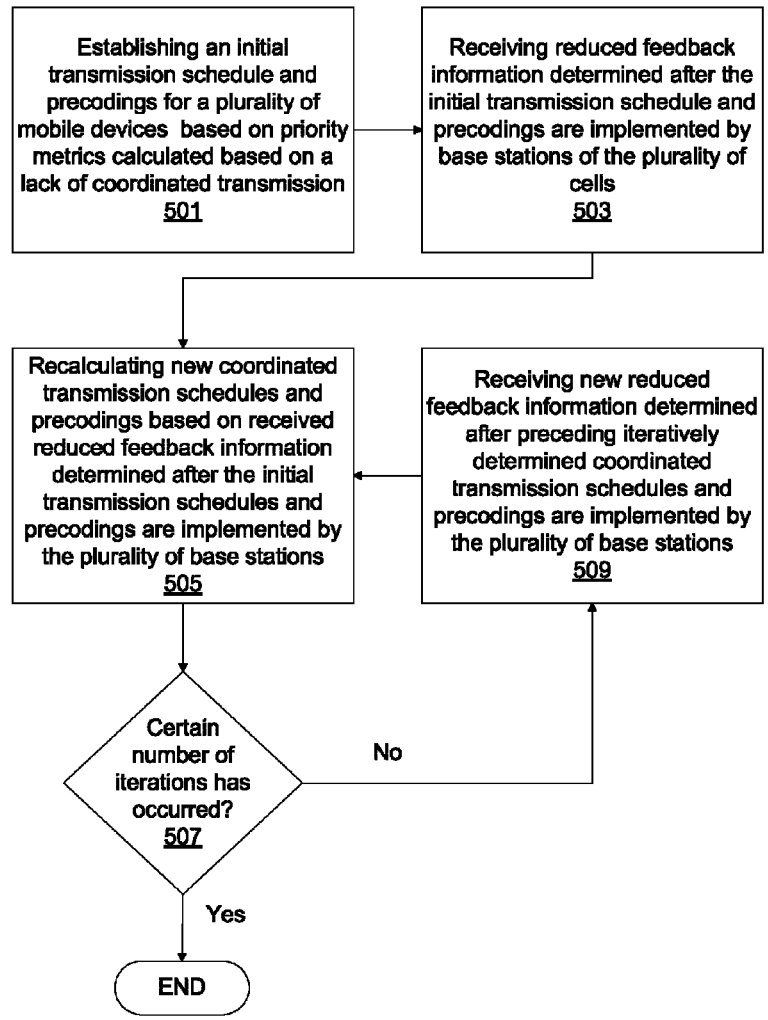
FIG. 5 illustrates a coordinated transmission technique in a wireless transmission system employing a centralized processor, in accordance with embodiments of the present disclosure.

FIG. 5 illustrates a coordinated transmission technique in a wireless transmission system employing a centralized processor, in accordance with embodiments of the present disclosure. A centralized processor establishes an initial transmission schedule and precodings for a plurality of mobile devices served by cells in a wireless transmission system based on priority metrics calculated based on a lack of coordinated transmission, block 501. The centralized processor receives reduced feedback information determined by the mobile devices after the initial transmission schedule and precodings are implemented by base stations of the plurality of cells, block 503. The feedback information includes vector approximations of feedback matrices associated with interfering channels established by various ones of the mobile devices with various ones of the plurality of base stations. The reduced feedback information includes vector approximations of feedback matrices for less than all interfering channels established by various ones of the mobile devices with interfering base stations. The reduced feedback information includes vector approximations of feedback matrices for only two interfering channels established by various ones of the mobile devices with interfering base stations. The reduced feedback information includes vector approximations of feedback matrices for channels established by various ones of the mobile devices with their respective serving base stations.

The centralized processor iteratively determines coordinated transmission schedules and precodings for the plurality of mobile devices served by the plurality of base stations. In a first iteration, the centralized processor recalculates new coordinated transmission schedules and precodings based on received reduced feedback information determined by the mobile devices after the initial transmission schedules and precodings are implemented by the plurality of base stations, block 505. Unless a certain number of iterations has occurred, decision block 507, the centralized processor receives new reduced feedback information from the mobile devices determined after preceding iteratively determined coordinated transmission schedules and precodings are implemented by the plurality of base stations, block 509.

Figure 6:
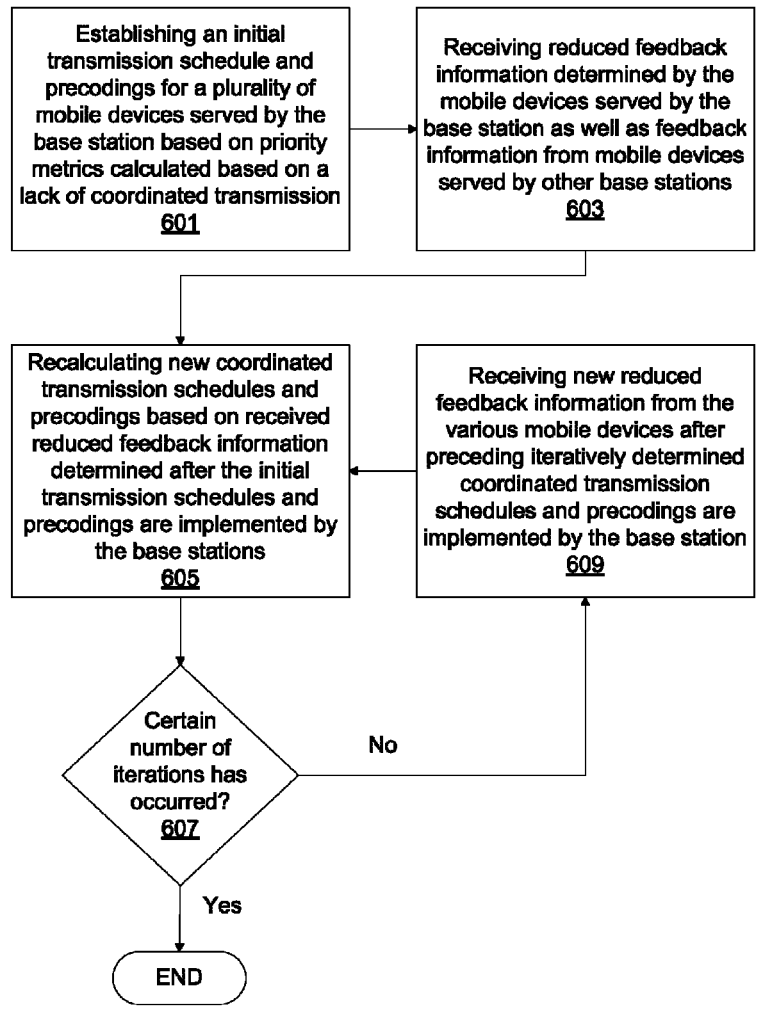
FIG. 6 illustrates a coordinated transmission technique in a wireless transmission system employing distributed processing at the base stations, in accordance with embodiments of the present disclosure.

FIG. 6 illustrates a coordinated transmission technique in a wireless transmission system employing distributed processing at the base stations, in accordance with embodiments of the present disclosure. A base station establishes an initial transmission schedule and precodings for a plurality of mobile devices served by the base station based on priority metrics calculated based on a lack of coordinated transmission, block 601. After the initial transmission schedule and precodings are implemented by the base station, the base station receives reduced feedback information determined by the mobile devices served by the base station as well as feedback information from mobile devices served by other base stations, block 603. The feedback information includes vector approximations of feedback matrices associated with interfering channels established by various ones of the mobile devices with the base station. The reduced feedback information includes vector approximations of feedback matrices for less than all interfering channels established by various ones of the mobile devices with the base station. The reduced feedback information may include vector approximations of feedback matrices for only two interfering channels established by various ones of the mobile devices with the base station.

The base station iteratively determines coordinated transmission schedules and precodings for the plurality of mobile devices served by the base station. In a first iteration, the base station recalculates new coordinated transmission schedules and precodings based on received reduced feedback information determined by the mobile devices after the initial transmission schedules and precodings are implemented by the base stations, block 605. Unless a certain number of iterations has occurred, decision block 607, the base station receives new reduced feedback information from the various mobile devices after preceding iteratively determined coordinated transmission schedules and precodings are implemented by the base station, block 609.

Figure 7:
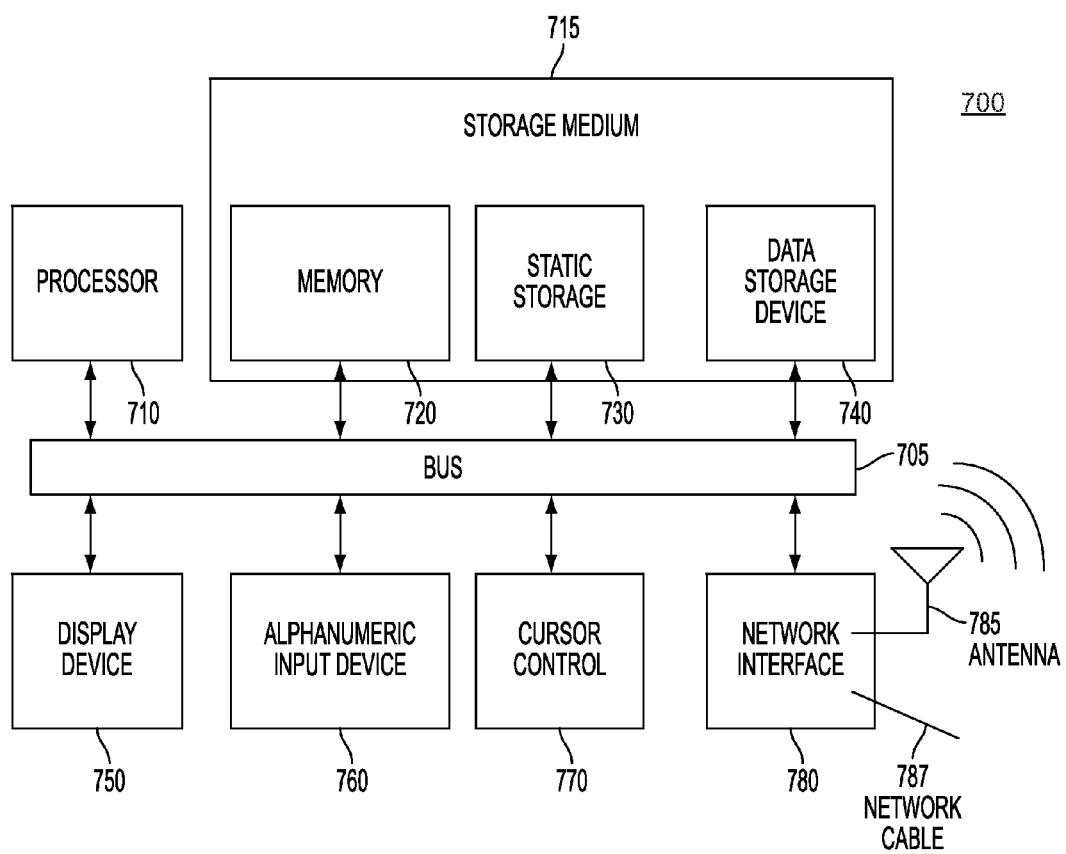
FIG. 7 schematically illustrates an electronic system that can be used to store and/or execute instructions associated with techniques described herein.

FIG. 7 schematically illustrates an electronic system that can be used to store and/or execute instructions associated with techniques described herein. Electronic system 700 schematically illustrates embodiments of the mobile device 100 of FIG. 1, the base station 200 of FIG. 2, and the centralized processor 321 of FIG. 3. Electronic system 700 is used to store and/or execute instructions associated with techniques described herein. For example, the electronic system 700 is used to store and/or execute instructions that result in actions described in connection with methods and techniques herein. The electronic system 700 is intended to represent a range of electronic devices (either wired or wireless) including, for example, desktop computer devices, laptop computer devices, personal computers (PC), servers, mobile devices, personal digital assistants (PDA) including cellular-enabled PDAs, pocket PCs, tablet PCs, but is not limited to these examples and can include other electronic devices. Alternative electronic systems can include more, fewer and/or different components.

The electronic system 700 includes a bus 705 or other communication device or interface to communicate information, and processor 710 coupled to bus 705 to process information. Bus 705 can be a single system bus or a number of buses of the same or different types bridged together. The processor 710 is representative of one or more processors and/or co-processors The electronic system 150 also includes a storage medium 715, which represents a variety of types of storage including memory 720, static storage 730, and data storage device 740. The storage medium 715 is coupled to bus 705 to store information and/or instructions that are processed and/or executed by processor 710. The storage medium 715 can include more or fewer types of storage than depicted. In one embodiment, the storage medium 715 is an article of manufacture having instructions stored thereon, that if executed, result in actions described herein. For example, the electronic system 700 can transmit or receive reduced feedback information as described herein.

The electronic system 700 includes random access memory (RAM) or other storage device 720 (may be referred to as "memory"), coupled to bus 705. The memory 720 is used to store temporary variables or other intermediate information during execution of instructions by processor 710. Memory 720 includes, for example, a flash memory device.

The electronic system 700 can also include read only memory (ROM) and/or other static storage deVice 730 coupled to bus 705 to store static information and instructions for processor 710. Data storage device 740 is coupled to bus 705 to store information and instructions. Data storage device 740 can include, for example, a magnetic disk or optical disc and corresponding drive coupled with the electronic system 150.

The electronic system 150 is coupled via bus 705 to display device 750, such as a cathode ray tube (CRT) or liquid crystal display (LCD), to display information to a user. Alphanumeric input device 760, including alphanumeric and other keys, can be coupled to bus 705 to communicate information and command selections to the processor 710. Cursor control 770 is another type of input device and includes, for example, a mouse, a trackball, or cursor direction keys to communicate information and command selections to the processor 710 and to control cursor movement on the display 750.

The electronic system 150 further includes one or more network interfaces 780 to provide access to network 720, such as a local area network, but is not limited in this regard. The network interface 780 can include, for example, a wireless network interface having antenna 785, which represents one or more antennae. The network interface 780 can also include, for example, a wired network interface to communicate with remote devices via network cable 787, which can be, for example, an Ethernet cable, a coaxial cable, a fiber optic cable, a serial cable, or a parallel cable.

What is claimed is:

1. A method for reducing interference feedback in a mobile device operating in a wireless system employing coordinated transmission, the method comprising:
    the mobile device establishing a plurality of channels with a corresponding plurality of base stations, wherein the plurality of base stations include (i) serving base station and (ii) a plurality of interfering base stations;
    the mobile device selecting a subset of the plurality of interfering base stations, wherein the subset of the plurality of interfering base stations excludes at least a first interfering base station of the plurality of interfering base stations; and
    the mobile device reporting, to the serving base station, (i) feedback information associated with the serving base station and (ii) feedback information associated with each interfering base station of the subset of the plurality of interfering base stations, wherein the mobile device refrains from reporting, to the serving base station, feedback information associated with the first interfering base station.

2. The method of claim 1, wherein the subset of plurality of interfering base stations comprises a second interfering base station of the plurality of interfering base stations, and wherein reporting feedback information associated with each interfering base station of the subset of the plurality of interfering base stations comprises:
    the mobile device reporting, to the serving base station, feedback information including a vector approximation of a feedback matrix associated with an interfering channel established with the second interfering base station of the subset of plurality of interfering base stations.

3. The method of claim 1, wherein the subset of the plurality of interfering base stations comprises two interfering base stations of the plurality of interfering base stations.

4. The method of claim 1, wherein selecting the subset of the plurality of interfering base stations further comprises:
    selecting the subset of the plurality of interfering base stations such that the subset of the plurality of interfering base stations have higher levels of interference among the plurality of interfering base stations.

5. The method of claim 1, wherein selecting the subset of the plurality of interfering base stations comprises:
    the mobile device selecting the subset of the plurality of interfering base stations such that the subset of the plurality of interfering base stations comprises a second base station of the plurality of interfering base stations, wherein interference signals received from the second base station include a strongest one of a plurality of interfering signals correspondingly received by a plurality of antennae of the mobile device.

6. The method of claim 1, wherein:
    the subset of the plurality of interfering base stations comprises a second base station of the plurality of interfering base stations; and
    the feedback information associated with each interfering base station of the subset of the plurality of interfering base stations comprises Eigen vector approximation of interference signal received from the second base station of the plurality of interfering base stations.

7. The method of claim 1, wherein reporting the feedback information associated with the serving base station further comprises:
    reporting an Eigen vector approximation of a strongest one of a plurality of serving signals correspondingly received by a plurality of antennae of the mobile device from the serving base station.

8. The method of claim 1, further comprising:
    prior to reporting the feedback information associated with each interfering base station of the subset of the plurality of interfering base stations, whitening the feedback information associated with each interfering base station of the subset of the plurality of interfering base stations,
    wherein whitening the feedback information associated with each interfering base station of the subset of the plurality of interfering base stations comprises
    estimating a covariance of thermal noise and interference from interfering base stations outside a reporting set of the plurality of interfering base stations.

9. The method of claim 1, wherein the feedback information associated with the serving base station comprises:
    two vector approximations of a feedback matrix associated with a channel established with the serving base station.

10. The method of claim 9, wherein the feedback information associated with each interfering base station of the subset of the plurality of interfering base stations comprises Eigen vector approximations associated with each interfering base station of the subset of the plurality of interfering base stations.

11. An apparatus, comprising:
    one or more antennae;
    a channel establishment module configured to establish a plurality of channels via the one or more antennae with a corresponding plurality of base stations, wherein the plurality of base stations includes Lla serving base station and (ii) a plurality of interfering base stations; and
    a feedback reporting module configured to
        select a subset of the plurality of interfering base stations, wherein the subset of the plurality of interfering base stations excludes at least a first interfering base station of the plurality of interfering base stations, and
        report to the serving base station, via the one or more antennae, (i) feedback information associated with the serving base station and (ii) feedback information associated with each interfering base station of the subset of the plurality of interfering base stations, wherein the apparatus refrains from reporting, to the serving base station, feedback information associated with the first interfering base station.

12. The apparatus of claim 11, wherein:
    the subset of the plurality of interfering base stations comprises a second interfering base station of plurality of interfering base stations; and
    the feedback information associated with each interfering base station of the subset of the plurality of interfering base stations comprises a vector approximation of a feedback matrix associated with an interfering channel established with the second interfering base station of the subset of plurality of interfering base stations.

13. The apparatus of claim 11, wherein the subset of the plurality of interfering base stations comprises two interfering base stations of the plurality of interfering base stations.

14. The apparatus of claim 11, wherein the feedback reporting module is further configured to select the subset of the plurality of interfering base stations such that the subset of the plurality of interfering base stations have higher levels of interference among the plurality of interfering base stations.

15. The apparatus of claim 11, wherein the feedback reporting module is further configured to select the subset of the plurality of interfering base stations by:
    selecting the subset of the plurality of interfering base stations such that the subset of the plurality of interfering base stations comprises a second base station of the plurality of interfering base stations, wherein interference signals received from the second base station include-a strongest one of a plurality of interfering signals correspondingly received by a plurality of antennae of the apparatus.

16. The apparatus of claim 11, wherein:
    the subset of the plurality of interfering base stations comprises a second base station of the plurality of interfering base stations; and
    the feedback information associated with each interfering base station of the subset of the plurality of interfering base stations comprises an Eigen vector approximation of an interference signal received from the second base station of the plurality of interfering base stations.

17. The apparatus of claim 11, wherein the feedback information associated with the serving base station comprises:
    an Eigen vector approximation of a strongest one of a plurality of serving signals correspondingly received by a plurality of antennae of the apparatus from the serving base station.

18. The apparatus of claim 11, further comprising:
    a whitening module configured to, prior to the reporting of the feedback information associated with each interfering base station of the subset of the plurality of interfering base stations, whiten the feedback information associated with each interfering base station of the subset of the plurality of interfering base stations,
    wherein the whitening module is further configured to whiten the feedback information associated with each interfering base station of the subset of the plurality of interfering base stations by
        estimating a covariance of thermal noise and interference from interfering base stations outside a reporting set of the plurality of interfering base stations.

19. The apparatus of claim 11, wherein the feedback information associated with the serving base station comprises:
    two vector approximations of a feedback matrix associated with a channel established with the serving base station.

20. The apparatus of claim 19, wherein the feedback information associated with each interfering base station of the subset of the plurality of interfering base stations comprises Eigen vector approximations associated with each interfering base station of the subset of the plurality of interfering base stations.

\* \* \* \* \*